(12) United States Patent
Sabet et al.

(10) Patent No.: US 10,339,517 B2
(45) Date of Patent: Jul. 2, 2019

(54) SYSTEM AND METHODS FOR PROVIDING GRATUITY BASED ON LOCATION

(71) Applicant: MasterCard International Incorporated, Purchase, NY (US)

(72) Inventors: Mostafa H. Sabet, Greenwich, CT (US); Matthew J. Miller, Redding, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 734 days.

(21) Appl. No.: 14/752,171

(22) Filed: Jun. 26, 2015

(65) Prior Publication Data

US 2016/0379201 A1 Dec. 29, 2016

(51) Int. Cl.
*G06Q 20/32* (2012.01)
*G06Q 20/10* (2012.01)

(52) U.S. Cl.
CPC ......... *G06Q 20/3224* (2013.01); *G06Q 20/10* (2013.01); *G06Q 20/32* (2013.01); *G06Q 20/322* (2013.01); *G06Q 20/3223* (2013.01); *G06Q 20/3276* (2013.01)

(58) Field of Classification Search
CPC ...... G06Q 20/322; G06Q 20/10; G06Q 20/32; G06Q 20/3224; G06Q 20/3223; G06Q 20/3276
See application file for complete search history.

(56) References Cited

U.S. PATENT DOCUMENTS

| 2007/0255653 | A1* | 11/2007 | Tumminaro | G06Q 20/10 |
| | | | | 705/39 |
| 2014/0136405 | A1* | 5/2014 | DuCharme | G06Q 20/3223 |
| | | | | 705/40 |
| 2014/0244489 | A1 | 8/2014 | Kessler | |
| 2015/0046274 | A1 | 2/2015 | Phillips | |
| 2015/0046320 | A1* | 2/2015 | Baldwin | G06Q 50/12 |
| | | | | 705/40 |
| 2015/0356547 | A1* | 12/2015 | Abed | G06F 16/24578 |
| | | | | 705/39 |

FOREIGN PATENT DOCUMENTS

| JP | 2007-299252 A | 11/2007 |
| JP | 2012-141914 A | 7/2012 |
| WO | WO-2015/068577 A1 | 5/2015 |

OTHER PUBLICATIONS

International Search Report and Written Opinion dated Aug. 3, 2016 for application PCT/US2016/034027, filed on May 25, 2016 (Applicant—MasterCard Int'l, Inc. // Inventor—Sabet, et al.) (8 pages).

\* cited by examiner

*Primary Examiner* — Joseph W. King
(74) *Attorney, Agent, or Firm* — Ballard Spahr LLP

(57) ABSTRACT

A system, method, and computer-readable storage medium configured to facilitate gratuities to individuals and employees of establishments based on location.

20 Claims, 6 Drawing Sheets

SYSTEM AND METHODS FOR PROVIDING GRATUITY BASED ON LOCATION

BACKGROUND

Field of the Disclosure

Aspects of the disclosure relate in general to financial services. Aspects include a method and system to facilitate gratuities to individuals and employees of establishments based on location.

Description of the Related Art

A payment card is a card that can be used by an accountholder and accepted by a merchant to make a payment for a purchase or in payment of some other obligation. Payment cards include credit cards, debit cards, charge cards, and Automated Teller Machine (ATM) cards. Payment cards provide the clients of a financial institution ("accountholders") with the ability to pay for goods and services without the inconvenience of using cash.

Payment cards provide the clients of a financial institution ("cardholders") with the ability to pay for goods and services without the inconvenience of using cash. For example, traditionally, whenever travelers leave home, they carried large amounts of cash to cover journey expenditures, such as transportation, lodging, and food. Payment cards eliminate the need for carrying large amounts of currency. Moreover, in international travel situations, payment cards obviate the hassle of changing currency.

Payment cards also help reduce the risk of loss from theft when carrying large amounts of currency. Stolen payment cards are easily cancelled, which reduces the potential loss by a cardholder.

Generally, the near-universal acceptance of payment cards allows accountholders to pay for most transactions. However, most people still use cash to pay small amounts, such as tips or other forms of gratuities.

SUMMARY

Embodiments include a system, device, method and computer-readable medium to facilitate gratuities to individuals and employees of establishments based on location.

In a payment device embodiment, the payment device comprises a processor, a display, and a wireless antenna. The processor is determines a location of the payment device. The display queries whether the potential tip recipient works at an establishment, resulting in an establishment status. The wireless antenna transmits to an application server the location of the payment device and the establishment status of the potential tip recipient, and receives a list of the potential tip recipients from the application server. The display presents the list of the potential tip recipients. The wireless antenna transmits a selected tip recipient to the application server.

In an application server embodiment, the application server comprises a network interface and a processor. The network interface receives a location of a payment device. The processor queries a database for a list of potential tip recipients based on the location of the payment device. The network interface transmits to the payment device the list of potential tip recipients. The network interface receives from the payment device a selected tip recipient from the list of potential tip recipients. The processor pays the selected tip recipient.

DETAILED DESCRIPTION

One aspect of the disclosure includes the realization that payment accountholders would pay small amounts to individuals, such as tips, provided there existed a secure mechanism to facilitate gratuities to individuals and employees of establishments, such as hotel employees, valets, luggage porters, red caps or other persons.

Another aspect of the disclosure is the realization that tips to hotel employees can be added to final hotel bills. A similar methodology may be used for other establishments, such as cruise ships, for example.

Aspects include a payment device, such as a mobile phone, running a mobile application and a back-end application server embodiment that facilitate gratuities to individuals and employees of establishments, using the location of the mobile phone as an indicator of the user location.

While embodiments described herein are applied to a payment network and point-of-sale context, it is understood by those familiar with the art that the concepts, apparatus, system and methods described herein may also be applicable to an issuer and point-of-sale context.

The systems and processes are not limited to the specific embodiments described herein. In addition, components of each system and each process can be practiced independently and separately from other components and processes described herein. Each component and process also can be used in combination with other assembly packages and processes.

For the purposes of this application, the terms "gratuity" and "tip" are synonymous.

Figure 1:
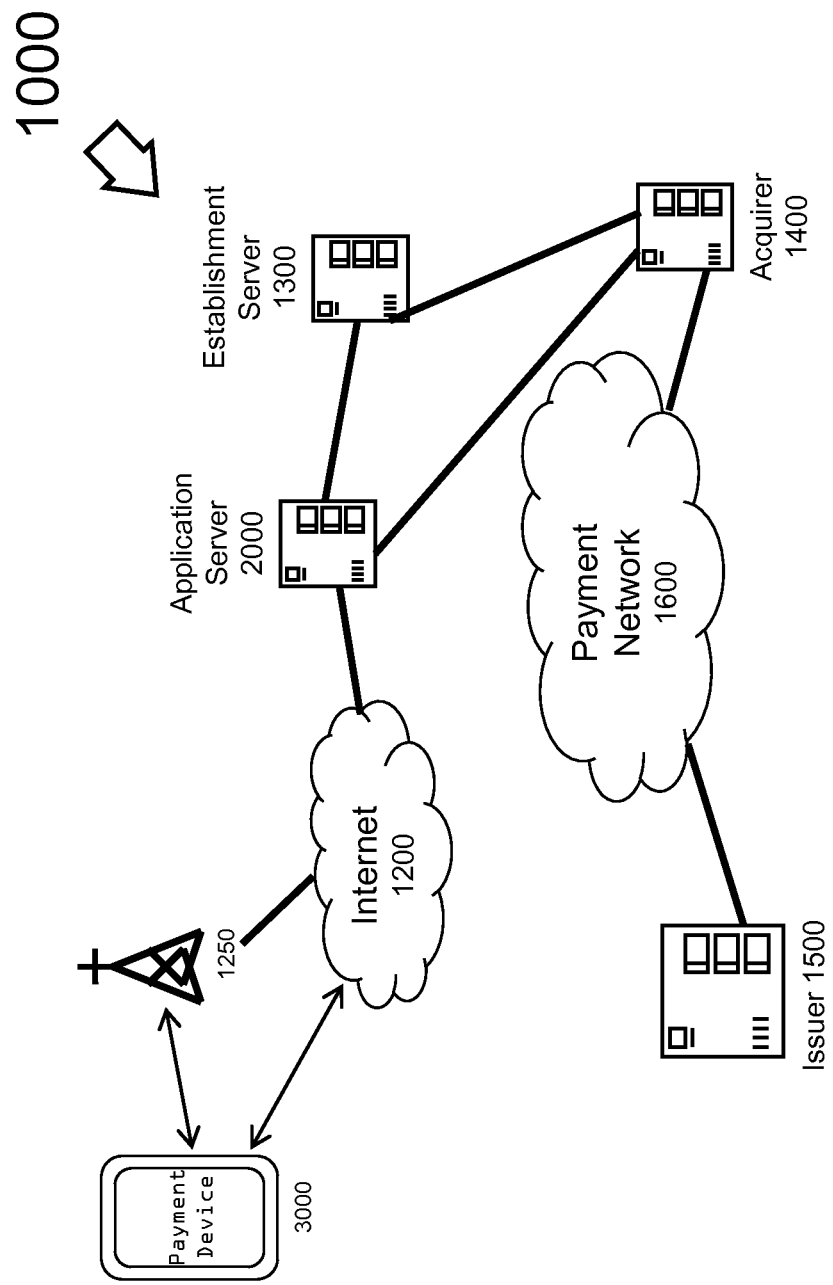
FIG. 1 is a block diagram illustrating a system to facilitate gratuities to individuals and employees of establishments based on location.

FIG. 1 is a block diagram 1000 illustrating a gratuity paid to individuals and employees of establishments using a payment device 3000, application server 2000, and payment network 1600. The present disclosure is related to a payment system, such as a credit card payment system using a payment network 1600, such as the MasterCard® interchange, Cirrus® network, or Maestro®. The MasterCard interchange is a proprietary communications standard promulgated by MasterCard International Incorporated of Purchase, N.Y., for the exchange of financial transaction data between financial institutions that are customers of MasterCard International Incorporated. Cirrus is a worldwide interbank network operated by MasterCard International Incorporated linking debit and payment devices to a network of ATMs throughout the world. Maestro is a multi-national debit card service owned by MasterCard International Incorporated.

In a financial payment system, a financial institution called the "issuer" 1500 issues a payment account to a consumer, who uses payment device 3000 to pay a gratuity for an individual or an employee of an establishment. Payment devices may include a mobile device such as key fobs, mobile phones, tablet computers, Personal Digital Assistants (PDAs), electronic wallets (sometimes referred to as a "mobile wallet") and the like. Payment devices may be used to tender the gratuity payment in-person at an establishment, or when connected via a mobile telephone network 1250 or the internet 1200.

Typically, when a user is making a purchase at an establishment, a user presents the payment device 3000 to a point-of-sale device at an establishment. The establishment will have an establishment server 1300. An example establishment is a hotel. The establishment is affiliated with a financial institution. This financial institution is usually called the "acquirer," the "acquiring bank" or "acquirer bank" 1400. The acquirer 1400 may be a merchant bank or a payment service provider (PSP). When a payment device 3000 is tendered at establishment, the establishment electronically requests authorization from the acquirer 1400 for the amount of the purchase.

However, in embodiments described below, the gratuity is not necessarily paid via an establishment point-of-sale device. Potential tip recipients (either as individuals or as employees of a known establishment) may either register their presence and location with an application server 2000. When a user is interested in paying a gratuity with a payment device 3000, the payment device 3000 determines its physical location, and communicates the location to the application server 2000. While FIG. 1, depicts an application server 2000 that is separate from a payment network 1600 or establishment server 1300, it is understood by one skilled in the art that application server 2000 may reside as a separate service, part of an establishment, or a service offered by a payment network.

In turn, application server 2000 or establishment server 1300 contact acquirer 1400 as part of the gratuity payment process described herein.

In some embodiments, an establishment server 1300 provides a list of potential tip recipients, which may be employees or employee departments which may receive a gratuity, to the application server 2000. Information on an establishment's location, employees, and employee departments are stored at the application server 2000. It is understood that employees may opt into the electronic gratuity program, and consent to the storage of their information at the application server 2000. Such information can include employee name, department, work location, or photograph. In a hotel example, the hotel departments could include: front desk employees, concierge, housekeeping, room service, engineering, and luggage attendants.

Additionally, application server 2000 stores the physical location of potential tip recipients not affiliated with an establishment. Potential tip recipients include valets, parking attendants, or other non-affiliated individuals.

Application server 2000 determines the potential tip recipients in physical proximity to the payment device 3000, and transmits the list to payment device 3000.

The potential tip recipients list, along with payment options, is presented to the user on the payment device for display and selection. Payment options include payment from an electronic wallet, an associated payment account or person-to-person payment to the tip recipient. For potential tip recipients at an establishment, the gratuity may be added to a final bill by the establishment.

When payment is made via an associated payment account, the application server 2000 will communicate, via payment network 1600, with the computers of the issuer 1500 to determine whether the consumer's account is in good standing and whether the accountholder is above the age required for age-restricted purchase. It is understood that any number of issuers 1500 may be connected to payment network 1600.

After a transaction is captured, a clearing process occurs.

Eventually, the transaction is settled between the establishment server 1300, the acquirer 1400, and the issuer 1500.

Figure 2:
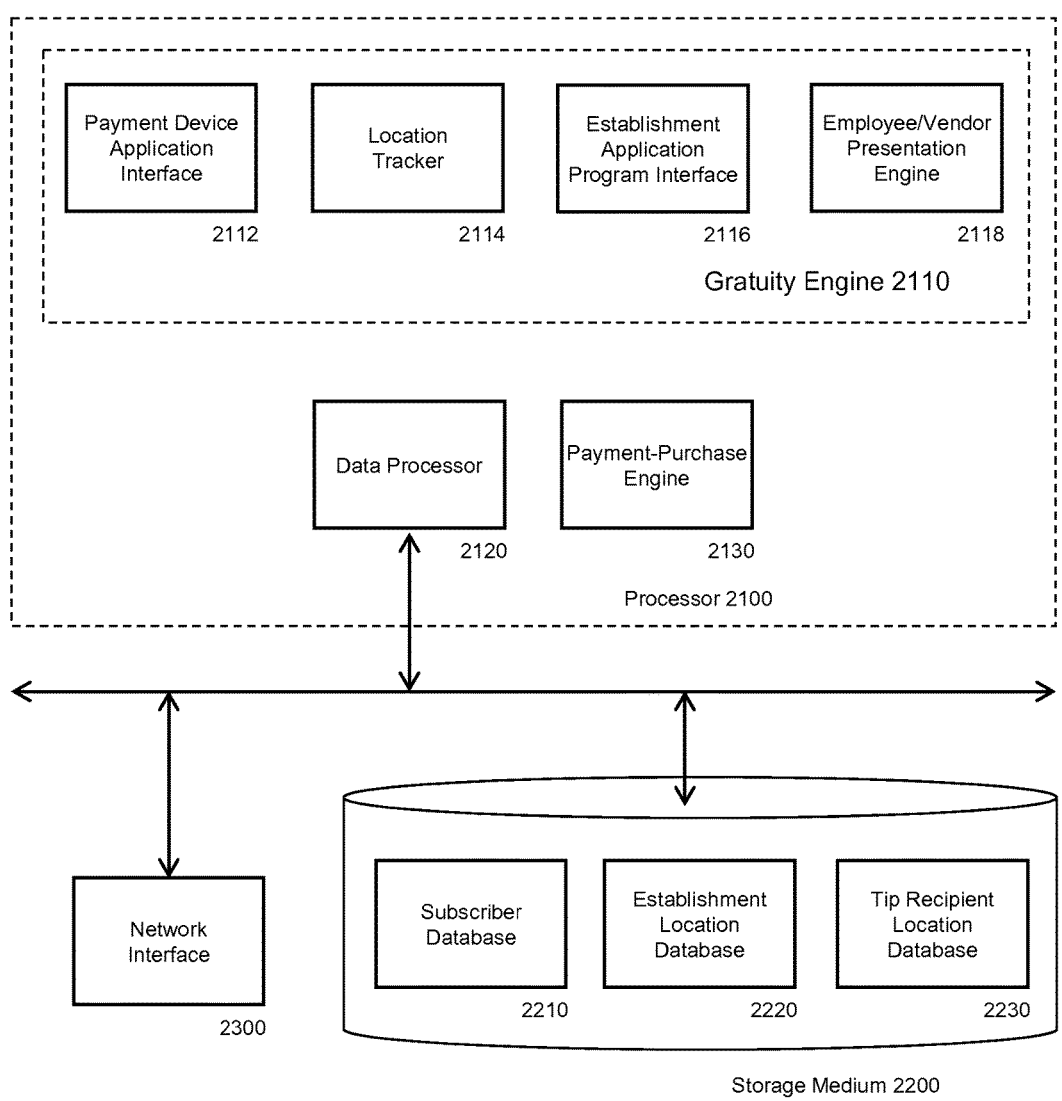
FIG. 2 is an expanded block diagram of an exemplary embodiment of an application server architecture to facilitate gratuities to individuals and employees of establishments based on location.

Embodiments will now be disclosed with reference to a block diagram of an exemplary application server 2000 of FIG. 2, configured to facilitate gratuities to individuals and employees of establishments based on location, constructed and operative in accordance with an embodiment of the present disclosure.

Application server 2000 may run a multi-tasking operating system (OS) and include at least one processor or central processing unit (CPU) 2100, a non-transitory computer-readable storage medium 2200, and a network interface 2300.

Processor 2100 may be any central processing unit, microprocessor, micro-controller, computational device or circuit known in the art. It is understood that processor 2100 may temporarily store data and instructions in a Random Access Memory (RAM) (not shown), as is known in the art.

As shown in FIG. 2, processor 2100 is functionally comprised of a gratuity engine 2110, a payment-purchase engine 2130, and a data processor 2120.

Data processor 2120 interfaces with storage medium 2200 and network interface 2300. The data processor 2120 enables processor 2100 to locate data on, read data from, and write data to, these components.

Payment-purchase engine 2130 performs payment and purchase transactions, and may do so in conjunction with gratuity engine 2110.

Gratuity engine 2110 is the structure that facilitates gratuities to individuals and employees of establishments based on location. Gratuity engine 2110 further comprises: payment device application interface 2112, location tracker 2114, establishment application program interface 2116, and employee/vendor presentation engine 2118. In some embodiments, gratuity engine 2110 supports a mobile application running on a payment device 3000, such as a gratuity application.

Payment device application interface 2112 is the interface that communicates with payment device 3000, and may do so in conjunction with network interface 2300.

Location tracker 2114 is the structure that determines the potential tip recipients located in proximately to the payment device 3000, and may do so using the locations of potential tip recipients stored in establishment location database 2220, and a tip recipient location database 2230.

Establishment application program interface 2116 is the electronic interface that facilitates communication with an establishment server 1300, and may do so in conjunction with network interface 2300.

Employee/vendor presentation engine 2118 is configured to organize and present potential tip recipients that are employees and/or departments located at an establishment, and may do so using the locations of potential tip recipients stored in establishment location database 2220. For example, suppose one hotel establishment only allows tipping to an entire department, which is then subsequently divided among the employees in the department. In such an example, employee/vendor presentation engine 2118 might present concierge, housekeeping, front desk, valet, room service and luggage attendant departments. Another hotel may allow tipping directly to an individual within a department; for that hotel, the employee/vendor presentation engine 2118 may present a list of employees organized by department or further by their association with the user (the maid assigned to the user's room, the waiter who served them, and the like).

These structures may be implemented as hardware, firmware, or software encoded on a computer readable medium, such as storage medium 2200. Further details of these components are described with their relation to method embodiments below.

Computer-readable storage medium 2200 may be a conventional read/write memory such as a magnetic disk drive, floppy disk drive, optical drive, compact-disk read-only-memory (CD-ROM) drive, digital versatile disk (DVD) drive, high definition digital versatile disk (HD-DVD) drive, Blu-ray disc drive, magneto-optical drive, optical drive, flash memory, memory stick, transistor-based memory, magnetic tape or other computer-readable memory device as is known in the art for storing and retrieving data. In some embodiments, computer-readable storage medium 2200 may be remotely located from processor 2100, and be connected to processor 2100 via a network such as a local area network (LAN), a wide area network (WAN), or the Internet.

In addition, as shown in FIG. 2, storage medium 2200 may also contain a subscriber database 2210, an establishment location database 2220, and a tip recipient location database 2230. Subscriber database 2210 contains information about a user of the payment device 3000 that subscribes to the tip payment service. Subscriber database 2210 may include stored payment accounts (and their Primary Account Numbers) associated with the user, including tokens representing such information, as well as an account transaction history, and data related to the user's affiliation with an establishment. Establishment location database 2220 contains the location of establishments that cooperate and participate with the gratuity service described herein; additionally, establishment location database 2220 contains departments or a list of employees participating in the gratuity service. Tip recipient location database 2230 is configured to store the location of potential tip recipients that are unaffiliated with an establishment; additionally, tip recipient location database 2230 may contain account information of the potential tip recipients to facilitate direct payment to the potential tip recipient.

Network interface 2300 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks. Network interface 2300 allows application server 2000 to communicate with acquirer 1400 and issuer 1500.

Figure 3:
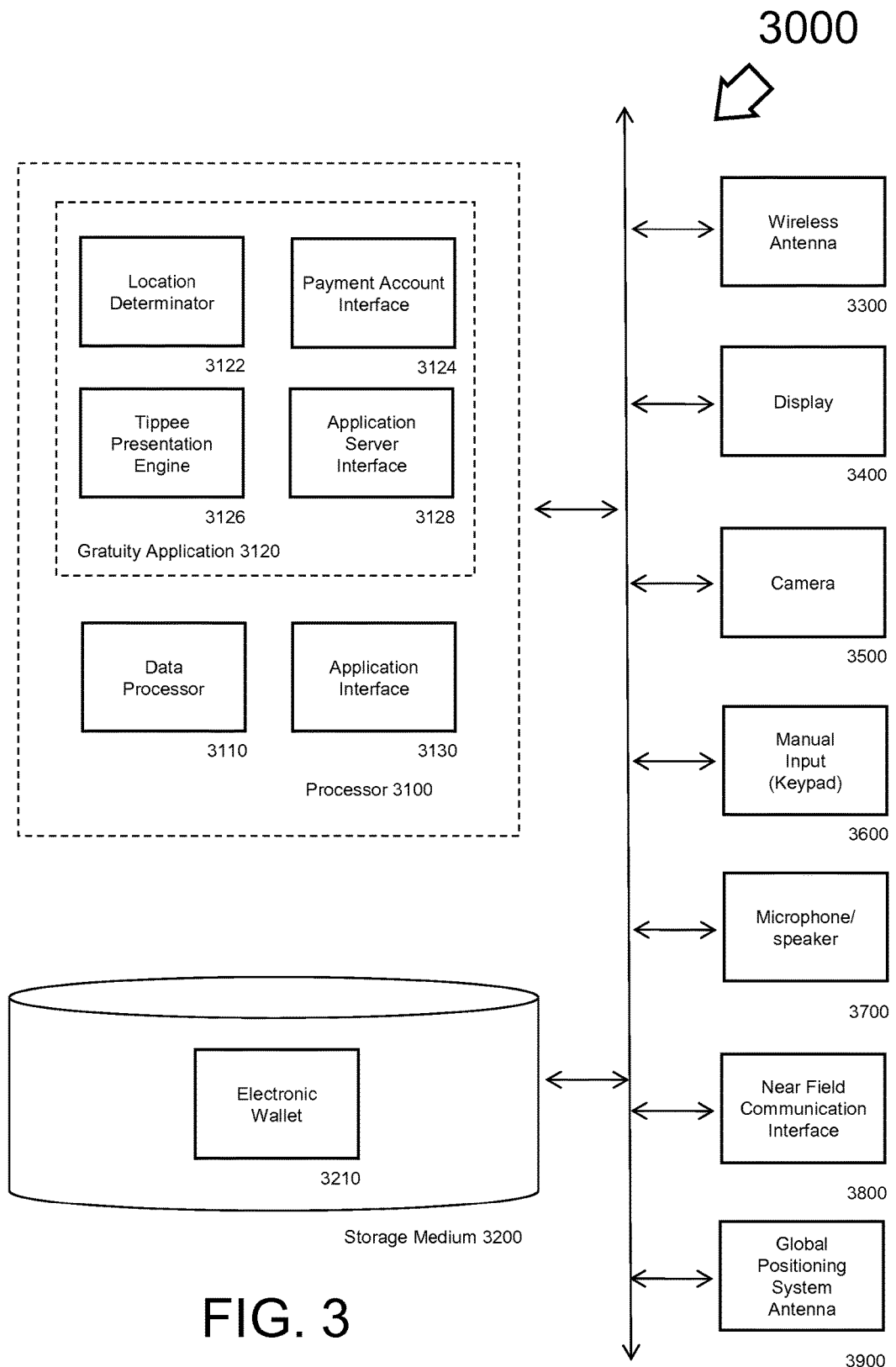
FIG. 3 depicts a block diagram of a payment device configured to facilitate gratuities to individuals and employees of establishments based on location.

Embodiments will now be disclosed with reference to a block diagram of a payment device 3000 of FIG. 3 designed to facilitate gratuities to individuals and employees of establishments based on location, constructed and operative in accordance with an embodiment of the present disclosure. Carried by a user, payment device 3000 is used to ascertain the location of the user to determine the potential tip recipients located nearby.

Payment device 3000 may be a mobile device such as a mobile phone or augmented reality device. In this example, payment device 3000 is a mobile phone. As mentioned above, it is understood by those familiar with the art that payment device 3000 may be a mobile phone, tablet computer, personal digital assistant (PDA) or other portable computing device known in the art capable of facilitating gratuities to individuals and employees of establishments based on location.

Payment device 3000 may run a real-time multi-tasking operating system (OS) and include at least one processor or central processing unit (CPU) 3100, a non-transitory computer-readable storage medium 3200, a network interface 2300, a display 3400, and a camera 3500. Payment device 3000 may further include manual input 3600, microphone/speaker 3700, near field communication interface 3800, and global positioning antenna 3900.

Processor 3100 may be any central processing unit, microprocessor, micro-controller, computational device or circuit known in the art. It is understood that processor 3100 may temporarily store instructions and data in Random Access Memory (not shown).

As shown in FIG. 3, processor 3100 is functionally comprised of a data processor 3110, a gratuity application 3120, and an application interface 3130.

Data processor 3110 enables processor 3100 to interface with storage medium 3200, wireless antenna 3300, display 3400, camera 3500, manual input 3600, microphone/speaker 3700, near field communication interface 3800, global positioning system antenna 3900, computer memory or any other component not on the processor 3100. The data processor 3110 enables processor 3100 to locate data on, read data from, and write data to these components.

Application interface 3130 may be any graphical user interface known in the art to facilitate communication with the user of the payment device 3000; as such, application interface 3130 may communicate with the user via display 3400, camera 3500, manual input 3600, or microphone/speaker 3700.

Gratuity application 3120 enables the functionality to facilitate gratuities to individuals and employees of establishments based on location. Gratuity application 3120 may further comprise: location determinator 3122, payment account interface 3124, tippee presentation engine 3126 and application server interface 3128.

A location determinator 3122 is the structure that enables gratuity application 3120 to determine the location of payment device 3000. Embodiments of location determinator 3122 may determine location using global positioning system antenna 3900, wireless antenna 3300 (using cellular signal triangulation, WiFi, or Bluetooth, for example), near field communication interface 3800, or by scanning a Quick Response ("QR") code using camera 3500, or other location identifying information.

Payment account interface 3124 is used to encrypt/decrypt payment account information stored in a electronic wallet 3210. Payment account interface 3124 facilitates the payment of a potential tip recipient.

Tippee presentation engine 3126 is the structure that enables organization and presentation of potential tip recipients received from application server 2000 on a display 3400 using application interface 3130. In some embodiments, tippee presentation engine 3126 presents pictures of the potential tip recipients on display 3400, as received from the employee/vendor presentation engine 2118 of the application server 2000.

Application server interface 3128 is the structure that enables the payment device 3000 to communicate with application server 2000, and may do so in conjunction with the wireless antenna 3300.

These structures may be implemented as hardware, firmware, or software encoded on a computer readable medium, such as storage medium 3200. Further details of these components are described with their relation to method embodiments below.

Wireless antenna 3300 may be any radio frequency (RF) transceiver as is known in the art for interfacing, communicating or transferring data across a telecommunications network, computer network, Bluetooth, WiFi, and the like. Examples of such a network include a digital cellular telephony network 1250. Wireless antenna 3300 allows payment device 3000 to communicate via the digital cellular telephony network to application server 2000, a payment network 1600, or other entities.

Display 3400 may be any liquid crystal display (LCD) display, light emitting diode (LED) screen, touch-sensitive screen, or other monitor known in the art for visually displaying images and text to a user.

A camera 3500 may be any image capture device configured to capture the image of an accountholder. Microphone/speaker 3700 may be any optical scanner to capture barcode images, as is known in the art. In some embodiments, camera 3500 may also act as microphone/speaker 3700. It is understood that microphone/speaker 3700 and camera 3500 may include appropriate digital-to-analog and analog-to-digital conversion circuitry as appropriate.

Manual input 3600 may be buttons, a conventional keyboard, keypad, track pad, trackball, or other input device as is known in the art for the manual input of data. In some embodiments, manual input 3600 may be integrated into a touch-sensitive display 3400. In other embodiments, manual input 3600 may be a virtual keyboard.

Microphone/speaker 3700 may be any audio receiving/reproduction device known in the art, including a bone conduction transducer. It is understood that microphone/speaker 3700 may include any analog-to-digital and digital-to-analog circuitry as is known in the art.

Near Field Communication (NFC) interface 3800 facilitates radio communication with other devices, such as contactless communication like MasterPass®.

Global Positioning System (GPS) antenna 3900 is a satellite antenna that provides location and time information anywhere there is an unobstructed line of sight to four or more GPS satellites.

Storage medium 3200 may be a conventional read/write memory such as a flash memory, memory stick, transistor-based memory, or other computer-readable memory device as is known in the art for storing and retrieving data.

In addition, as shown in FIG. 3, storage medium 3200 may also contain an electronic wallet 3210. An electronic wallet 3210 is a program or service where users can store and control their electronic shopping information, like log-ins, passwords, billing address, shipping address, payment card details, contactless payment information, Primary Account Numbers, in one central place. An electronic wallet 3210 is a structure that enables electronic forms of payment, such as a contactless or near-field communication (NFC) payment, and may be associated with any electronic form of payment known in the art, such as checking accounts, credit cards, debit cards, pre-paid cards, charge cards, electronic checks, electronic funds transfers, or any other form of electronic payment known in the art.

Figure 4A:
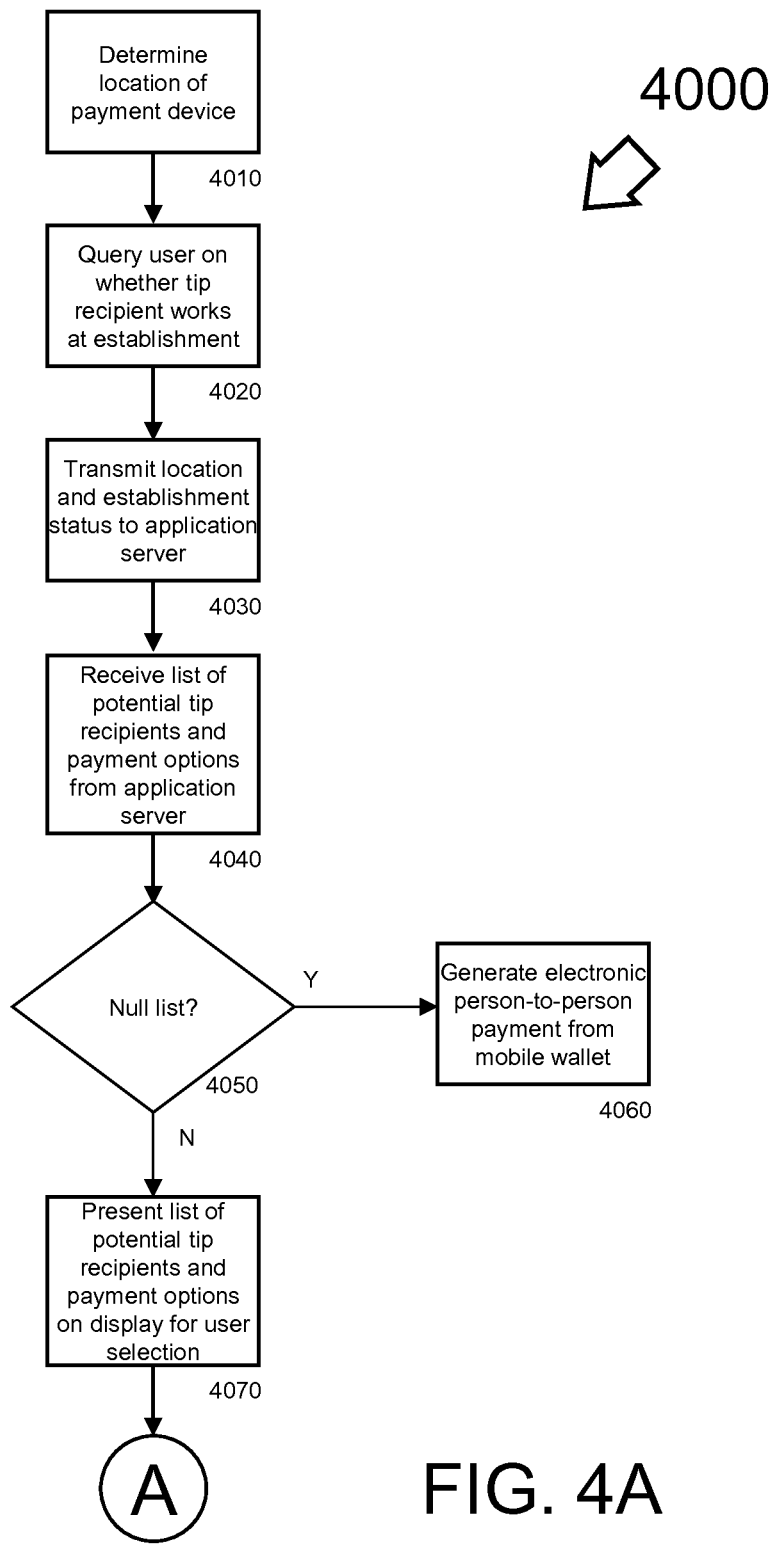
FIGS. 4A-B illustrates a payment device method to facilitate gratuities to individuals and employees of establishments based on location.
Figure 4B:
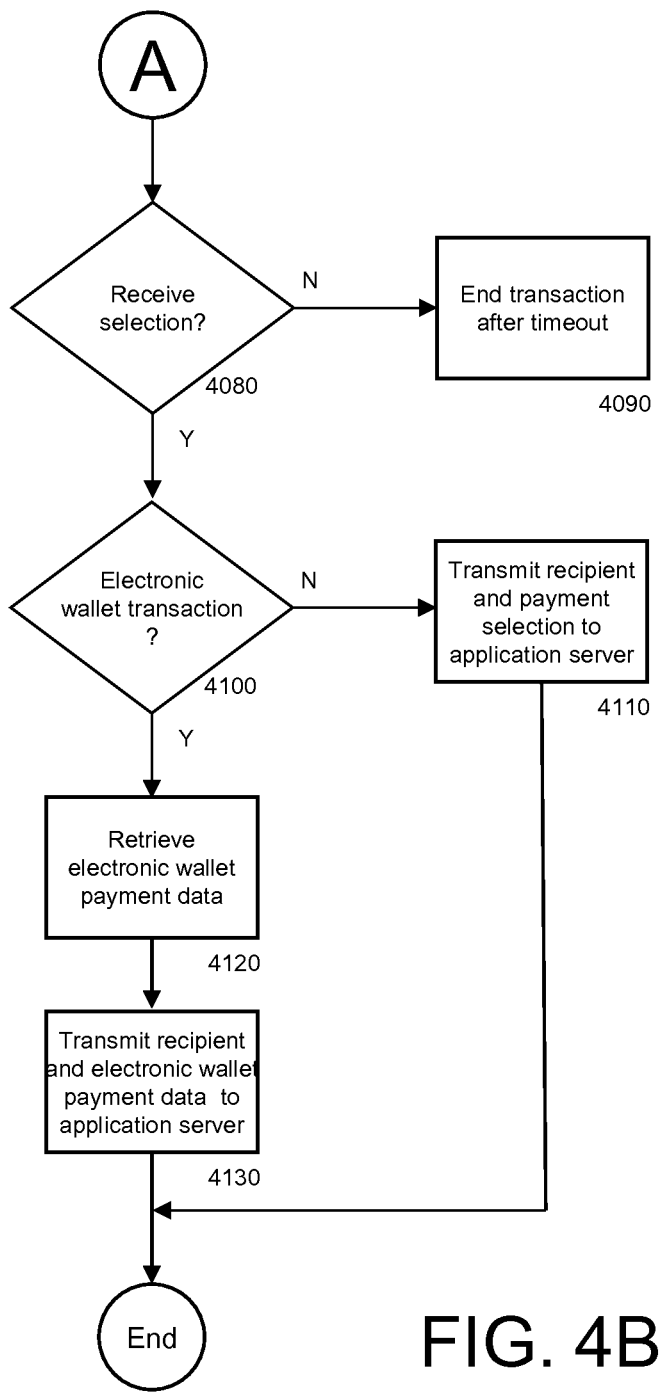
Figure 5:
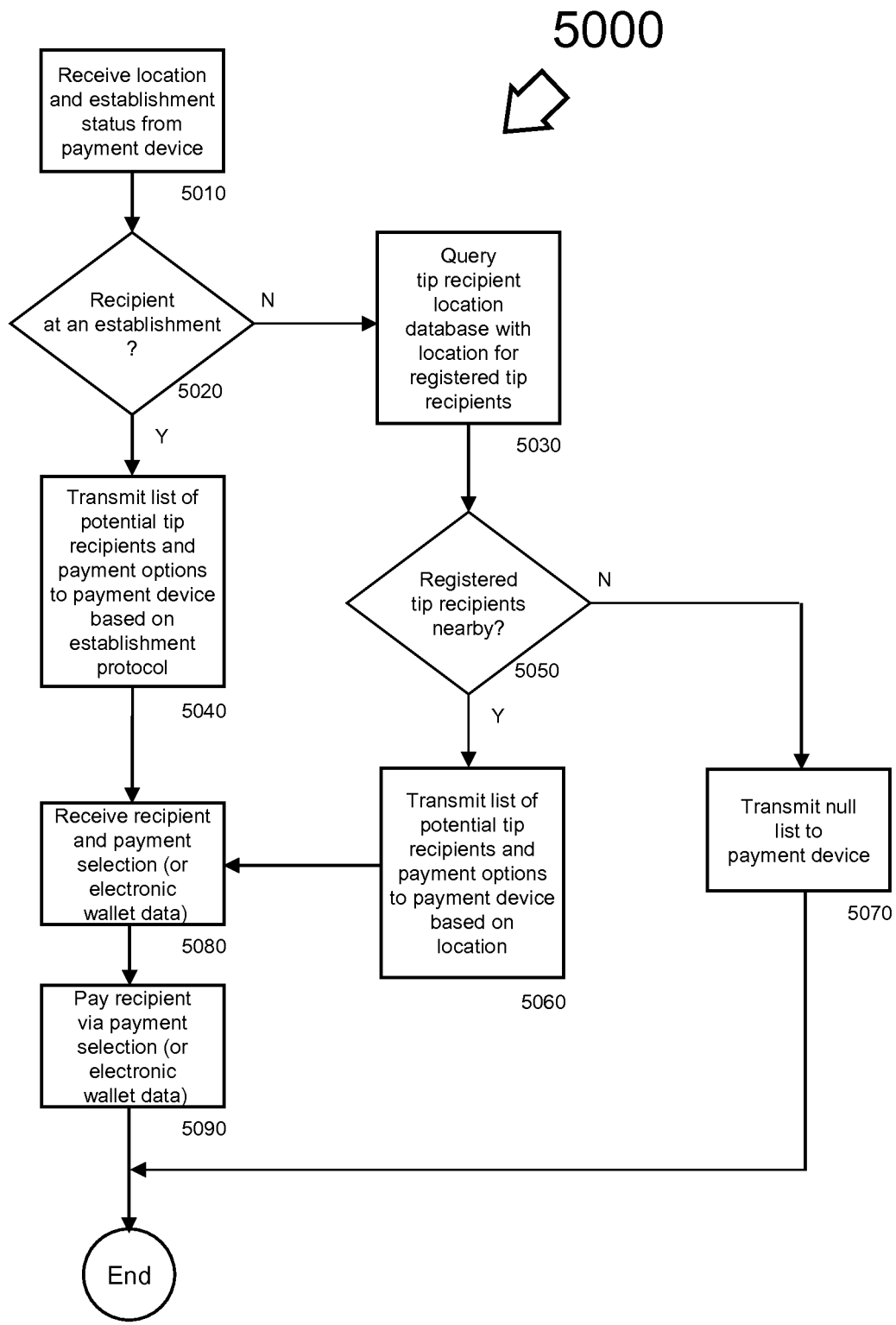
FIG. 5 illustrates a method to facilitate gratuities to individuals and employees of establishments based on location.

We now turn our attention to a method or process embodiment of the present disclosure, FIGS. 4 and 5. It is understood by those known in the art that instructions for such method embodiments may be stored on their respective computer-readable memory and executed by their respective processors.

Embodiments facilitate gratuities to individuals and employees of establishments based on location.

FIGS. 4A-B illustrates a payment device method 4000 to facilitate gratuities to individuals and employees of establishments based on location, constructed and operative in accordance with an embodiment of the present disclosure. It is understood by those familiar with the art that process 4000 is a real-time process.

Initially, the user has decided to use payment device 3000 to pay a gratuity to a potential tip recipient, and has launched gratuity application 3120 on payment device 3000. Gratuity application 3120 (and payment device 3000) begins executing process 4000.

At block 4010, location determinator 3122 determines the location of payment device 3000. In some embodiments, location determinator 3122 uses GPS antenna 3900 to determine its physical location. However, if GPS antenna is unable to determine the physical location, wireless antenna 3300 may use WiFi, Bluetooth, or cellular base station triangulation to assist in the determination. In addition in some embodiments, the physical location may be communicated to payment device via NFC (using near field communication interface 3800) or the scanning a QR code or other location identifying information (using camera 3500).

The user is queried on whether the potential tip recipient works at an establishment using application interface 3130, block 4020.

The physical location and the potential tip recipient establishment status is transmitted to application server 2000 using application server interface 3128 and wireless antenna 3300, block 4030.

At block 4040, application server interface 3128 and wireless antenna 3300 receives a list of potential tip recipients and payment options from application server 2000. Depending upon whether the potential tip recipient is an establishment employee, the potential tip recipients may be identified by name, establishment department, or both. In some embodiments, the list includes photographs (GIF, JPEG, or other picture files as is known in the art) of the potential tip recipients. In some instances, the application server 2000 is unable to identify any known potential tip recipients, and the tip recipient list is empty—a "null list." Payment options may include any form of payment permissible by electronic wallet 3210. In addition, when the potential tip recipient is an establishment employee or department, the establishment server 1300 may receive a payment on the employee/department's behalf for eventual distribution to the employee. In another embodiment, the establishment server 1300 may put the tip on the user's establishment bill. For example, if the establishment is a hotel, and the user has decided to tip the concierge twenty dollars via process 4000, an additional twenty dollar line item of "concierge tip" may be added to the hotel bill.

At decision block 4050, the tippee presentation engine 3126 determines whether the received tip recipient list is a null list. If the received tip recipient list is a null list, the process continues at block 4060. If the received tip recipient list contains a list of tip recipients (is not a null list), the process continues at block 4070.

If the received tip recipient list is a null list, it means that the potential tip recipient is not known in the system and is not associated with any known establishment in the area. Consequently, at block 4060, gratuity application 3120 uses electronic wallet 3210 to generate an electronic person-to-person payment. An example electronic person-to-person payment can be found in U.S. Patent Publication No. 2014/0136405 A1, "Systems and Methods for Processing of Person-to-Person Electronic Payments," filed on Nov. 15, 2012, assigned to MasterCard International Incorporated of Purchase, N.Y., and incorporated herein by reference. Once the person-to-person payment is made, process 4000 ends.

If the process continues at block 4070, the received tip recipient list contains a known potential tip recipient or an employee or department of a known establishment in the area, and tippee presentation engine 3126 presents the list of potential tip recipients and payment options on display 3400 for user selection.

If the user does not select potential tip recipients or payment options, as determined at decision block 4080, the transaction ends after a timeout, block 4090.

When the user selects potential tip recipients and payment options, as determined at decision block 4080, the process continues at block 4100.

In some instances, certain payment options include making payment transactions via payment account interface 3124 using an electronic wallet 3210. When the gratuity is being paid via an electronic wallet transaction, as determined at decision block 4100, process 4000 continues at block 4120. When the gratuity is not being paid via an electronic wallet transaction, as determined at decision block 4100, the recipient and payment option selection is transmitted to the application server 2000, block 4110, and the process 4000 ends.

At block 4120, the payment account interface 3124 retrieves the electronic wallet 3210 payment data based on the user selection. The recipient and electronic wallet payment data is transmitted to the application server 2000 via the wireless antenna 3300, and the process ends.

FIG. 5 illustrates a method 5000, from the perspective of the application server 2000, to facilitate gratuities to individuals and employees of establishments based on location, constructed and operative in accordance with an embodiment of the present disclosure.

At block 5010, the network interface 2300 of the application server 2000 receives a location and potential tip recipient establishment status from a payment device 3000. The location may be a geographic location represented by coordinates, relative distance from a known location (such as a digital cellular network antenna), or proximity to a wireless network. The location also may be a virtual location, such as an establishment department or individual. The payment device application interface 2112 receives the data from network interface 2300 and interprets the data for gratuity engine 2110.

If the potential tip recipient is designated as an establishment employee, as determined at decision block 5020, the process 5000 continues at block 5040; otherwise, the process continues at block 5030.

At block 5030, the potential tip recipient is not an establishment employee, and the location tracker 2114 queries the tip recipient location database with the received location for registered tip recipients in the area. Registered tip recipients are potential tip recipients that are not establishment employees and have registered a physical location and optional methods of receiving payment (i.e. "payment options") in a tip recipient location database 2230. Depending upon the embodiment, the radius of the search may range from a city block to a kilometer. Searches in urban locations with high population density will have a narrower radius, while searches in rural areas may have a larger radius.

When there are no registered tip recipients found at decision block 5050, a null list is transmitted to payment device 3000 via network interface 2300.

When there are registered tip recipients found based on the location, as determined at decision block 5050, network interface 2300 transmits the list of potential tip recipients and payment options to payment device 3000, block 5060. The process flow continues at block 5080.

At block 5040, gratuity engine 2110 queries establishment location database 2220 for a list of potential tip recipients and payment options to payment device based on a protocol created by the establishment, and transmits the results to payment device 3000.

At block 5080, mobile device application interface receives a recipient and payment option selection (which may include electronic wallet data) from payment device 3000.

Gratuity engine 2110 uses payment-purchase engine 2130 to initiate the recipient payment with the selected payment option (or electronic wallet data), block 5090.

It is understood by those familiar with the art that the system described herein may be implemented in hardware, firmware, or software encoded on a non-transitory computer-readable storage medium.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. An apparatus comprising:
 a user interface configured to receive a request from a user to transmit a tip to an intended tip recipient;
 a processor configured to determine, based on a quick response code scanned with a camera coupled to the apparatus, a present location of the apparatus;
 a user interface configured to:
  present a list of potential tip recipients associated with the determined present location;
  permit the user to indicate whether the intended tip recipient is an employee of an establishment at the determined present location; and;
 receive a selection made by the user from the list of potential tip recipients, wherein the received selection indicates the selected tip recipient is an employee of the establishment at the determined present location and includes an identifier associated with the selected tip recipient;
 a transmitter configured to transmit, to an application server via a network interface, the determined present location of the apparatus, data indicative of the selected tip recipient, an indication that the selected tip recipient is an employee of the establishment at the determined present location, and the identifier associated with the selected tip recipient;
 a receiver configured to receive, from the application server via the network interface, an indication that the selected tip recipient is an employee of the establishment at the determined present location and a plurality of payment options comprising a payment account option, an electronic wallet payment option, and an option to add the tip to a final establishment bill;
 the user interface further configured to present the received plurality of payment options;
 the processor further configured to generate, based on an indication received via the user interface of a selection of the electronic wallet payment option by the user, a request for a person-to-person payment to be sent to the intended tip recipient via an electronic wallet stored on the apparatus; and;

the transmitter further configured to transmit the request for the person-to-person payment to the application server via the network interface, wherein transmitting the request for the person-to-person payment to the application server includes transmitting encrypted payment account information associated with the electronic wallet and causes the application server to transmit a payment as the tip to the intended tip recipient based on the identifier associated with the selected tip recipient and the encrypted payment account information.

2. The apparatus of claim 1, wherein the present location of the apparatus is determined via a wireless antenna coupled to the apparatus.

3. The apparatus of claim 1, further comprising the receiver further configured to:
receive, from the application server, a tip confirmation message.

4. The apparatus of claim 3, wherein the tip confirmation message is sent by the application server after the application server transmits the payment to the intended tip recipient.

5. The apparatus of claim 1, wherein the identifier associated with the selected tip recipient comprises one or more of a name or a department of the establishment at the determined present location.

6. The apparatus of claim 1, wherein the present location of the apparatus is determined via a near field communication interface of the apparatus.

7. The apparatus of claim 1, further comprising a global positioning antenna, wherein the present location of the apparatus is determined with the global positioning antenna.

8. A method comprising:
receiving, by a mobile device via a user interface, a request from a user to transmit a tip to an intended tip recipient;
determining, by the mobile device based on a quick response code scanned with a camera coupled to the mobile device, a present location of the mobile device;
presenting, by the mobile device to the user via the user interface, a list of potential tip recipients associated with the determined present location, wherein the user interface is configured to permit the user to indicate whether the intended tip recipient is an employee of an establishment at the determined present location;
receiving, by the mobile device via the user interface, a selection made by the user from the list of potential tip recipients, wherein the received selection indicates the selected tip recipient is an employee of the establishment at the determined present location and includes an identifier associated with the selected tip recipient;
transmitting, by the mobile device to an application server via a network interface, the determined present location of the mobile device, data indicative of the selected tip recipient, an indication that the selected tip recipient is an employee of the establishment at the determined present location, and the identifier associated with the selected tip recipient;
receiving, by the mobile device via the network interface from the application server, an indication that the selected tip recipient is an employee of the establishment at the determined present location and a plurality of payment options comprising a payment account option, an electronic wallet payment option, and an option to add the tip to a final establishment bill;
presenting, by the mobile device via the user interface, the received plurality of payment options;

generating, based on an indication received via the user interface of a selection of the electronic wallet payment option for the tip by the user, a request for a person-to-person payment to be sent to the intended tip recipient via an electronic wallet stored on the mobile device; and transmitting, by the mobile device via the network interface, the request for the person-to-person payment data to the application server, wherein transmitting the request for the person-to-person payment to the application server includes transmitting encrypted payment account information associated with the electronic wallet and causes the application server to transmit a payment as the tip to the intended tip recipient based on the identifier associated with the selected tip recipient and the encrypted payment account information.

9. The method of claim 8, wherein the present location of the mobile device is determined via a wireless antenna coupled to the mobile device.

10. The method of claim 8, further comprising:
receiving, by the mobile device from the application server, a tip confirmation message.

11. The method of claim 10, wherein the tip confirmation message is sent by the application server after the application server transmits the payment to the intended tip recipient.

12. The method of claim 8, wherein the identifier associated with the selected tip recipient comprises one or more of a name or a department of the establishment at the determined present location.

13. The method of claim 8, wherein the present location of the mobile device is determined via a near field communication interface coupled to the mobile device.

14. The method of claim 8, wherein the present location of the mobile device is determined via a global positioning antenna coupled to the mobile device.

15. A non-transitory computer-readable storage medium encoded with data and instructions, which when executed by a computing device cause the computing device to:
receive, via a user interface of the computing device, a request from a user to transmit a tip to an intended tip recipient;
determine, based on a quick response code scanned with a camera coupled to the computing device, a present location;
present, to the user via the user interface, a list of potential tip recipients associated with the determined present location, wherein the user interface is configured to permit the user to indicate whether the intended recipient is an employee of an establishment at the determined present location;
receive, via the user interface, a selection made by the user from the list of potential tip recipients, wherein the received selection indicates the selected tip recipient is an employee of the establishment at the determined present location and includes an identifier associated with the selected tip recipient;
transmit, to an application server via a network interface, the determined present location, data indicative of the selected tip recipient, an indication that the selected tip recipient is an employee of the establishment at the determined present location, and the identifier associated with the selected tip recipient;
receive, via the network interface from the application server, an indication that the selected tip recipient is an employee of the establishment at the determined present location and a plurality of payment options comprising a payment account option, an electronic wallet payment option, and an option to add the tip to a final establishment bill;

present, via the user interface, the received plurality of payment options;

generate, based on an indication received via the user interface of a selection of the electronic wallet payment option for the tip by the user, a request for a person-to-person payment to be sent to the intended tip recipient via an electronic wallet stored on the computing device; and transmit, via the network interface, the request for the person-to-person payment to the application server, wherein transmitting the request for the person-to-person payment to the application server includes transmitting encrypted payment account information associated with the electronic wallet and causes the application server to transmit a payment as the tip to the intended tip recipient based on the identifier associated with the selected tip recipient and the encrypted payment account information.

16. The non-transitory computer-readable storage medium of claim 15, wherein the present location is determined via a wireless antenna.

17. The non-transitory computer-readable storage medium of claim 15, wherein the data and instructions further cause the computing device to:
   receive, from the application server, a tip confirmation message.

18. The non-transitory computer-readable storage medium of claim 17, wherein the tip confirmation message is sent by the application server after the application server transmits the payment to the intended tip recipient.

19. The non-transitory computer-readable storage medium of claim 15, wherein the identifier associated with the selected tip recipient comprises one or more of a name or a department of the establishment at the determined present location.

20. The non-transitory computer-readable storage medium of claim 15, wherein the present location is determined via a near field communication interface of the mobile device.

* * * * *